(12) United States Patent
Schmit et al.

(10) Patent No.: US 8,570,767 B2
(45) Date of Patent: Oct. 29, 2013

(54) CAPACITOR ASSEMBLY

(75) Inventors: Christopher J. Schmit, Fargo, ND (US); Jeffrey S. Duppong, Fargo, ND (US)

(73) Assignee: Deere & Company, Moline, IL (US)

( * ) Notice: Subject to any disclaimer, the term of this patent is extended or adjusted under 35 U.S.C. 154(b) by 311 days.

(21) Appl. No.: 13/170,582

(22) Filed: Jun. 28, 2011

(65) Prior Publication Data

US 2012/0243142 A1   Sep. 27, 2012

Related U.S. Application Data

(60) Provisional application No. 61/454,874, filed on Mar. 21, 2011.

(51) Int. Cl.
| | |
|---|---|
| H05K 7/00 | (2006.01) |
| H05K 7/18 | (2006.01) |
| H05K 7/16 | (2006.01) |
| H05K 5/00 | (2006.01) |
| H05K 1/14 | (2006.01) |
| G12B 9/00 | (2006.01) |
| A47B 97/04 | (2006.01) |
| A47B 97/06 | (2006.01) |
| F16M 13/00 | (2006.01) |

(52) U.S. Cl.
USPC ........... 361/821; 361/726; 361/732; 361/740; 361/759; 361/801; 361/802; 248/27.3; 248/447.2; 248/556; 248/557

(58) Field of Classification Search
USPC ......... 361/726, 732, 740, 759, 801–802, 821; 248/27.3, 447.2, 556–557
See application file for complete search history.

(56) References Cited

U.S. PATENT DOCUMENTS

| | | |
|---|---|---|
| 3,629,935 A | 12/1971 | Carino |
| 3,644,796 A | 2/1972 | Carino |
| 3,648,337 A | 3/1972 | Greskamp et al. |
| 5,624,202 A | 4/1997 | Grierson |
| 6,741,451 B2 | 5/2004 | Aoyama |
| 7,286,335 B2 | 10/2007 | Hozumi et al. |
| 7,808,771 B2 | 10/2010 | Nguyen et al. |
| 2005/0178711 A1 | 8/2005 | Reid |
| 2009/0002942 A1 * | 1/2009 | Seifert et al. ............... 361/694 |
| 2009/0042454 A1 * | 2/2009 | Finona ........................ 439/869 |

FOREIGN PATENT DOCUMENTS

JP     05198457 A  *  8/1993

OTHER PUBLICATIONS

International Search Report and the Written Opinion of the International Searching Authority, dated Jul. 6, 2012 (10 pages).

* cited by examiner

*Primary Examiner* — Hung S Bui
*Assistant Examiner* — Arun Ramaswamy (57) ABSTRACT

A lower enclosure has a first recess. A first annular retainer is adapted for engaging a lower portion of a capacitor and the first recess. The first annular retainer has a plurality of tabs that extend radially outward from an outer diameter surface of the first annular retainer. Each of the tabs has a sloped surface or a peaked surface for compression of the first annular retainer against the capacitor. An upper enclosure has a plurality of second recesses. A second annular retainer is adapted for engaging an upper portion of the capacitor and the second recesses. The second annular retainer has a plurality of protrusions that extend upward from the second annular retainer. Each of the protrusions has a slit for receiving a wedge, such that if the protrusions engage the wedge the second annular retainer is compressed against the capacitor.

21 Claims, 7 Drawing Sheets

CAPACITOR ASSEMBLY

This document claims priority based on U.S. provisional application Ser. No. 61/454,847, filed on 21 Mar. 2011 and entitled CAPACITOR ASSEMBLY, under 35 U.S.C. 119(e).

FIELD OF THE INVENTION

This invention relates to a capacitor assembly.

BACKGROUND

In some prior art, capacitors may be susceptible to damage from mechanical stress, vibration or thermal stress. Certain prior art capacitors that are installed on vehicles or off-road equipment may be particularly susceptible to damage from mechanical stress, vibration, or thermal stress; in contrast to capacitors that are installed indoors in environmentally controlled environments. In some prior art configurations, the body of a capacitor can create a mechanical lever arm or cantilever that can place undesirable mechanical stress on the capacitor's electrical or mechanical connection points to a circuit board or an enclosure. The deleterious effects of mechanical stress, such as failure of electrical or mechanical connections, can be exacerbated by vibration of the capacitor. Further, after experiencing many cycles of material thermal fluctuation (e.g., from ambient temperature to approximately 85 degrees Celsius) over time, the outer dielectric packaging (e.g., polyvinylchloride sheathing or shrink-wrap) of a capacitor may deteriorate or expose the interior electrical portion of the capacitor, which can lead to shorts with adjacent electrical components, metallic components, a heat sink, or chassis ground. Ambient temperature may range from approximately −40 degrees Celsius to approximately +40 degrees Celsius, while the operation of power semiconductors or other electrical components may add to the thermal loading on the capacitors. Thus, there is need to provide a capacitor assembly with improved resistance to damage from vibration, thermal stress, or mechanical stress.

SUMMARY OF THE INVENTION

In accordance with one embodiment, a capacitor assembly comprises a capacitor with a generally cylindrical outer surface. A lower enclosure has a first recess. A first annular retainer is adapted for engaging a lower portion of the capacitor and the first recess. The first annular retainer has a plurality of tabs that extend radially outward from an outer diameter surface of the first annular retainer. Each of the tabs has a sloped surface or a peaked surface for compression of the first annular retainer against the capacitor. An upper enclosure has a plurality of second recesses. A second annular retainer is adapted for engaging an upper portion of the capacitor and the second recesses. The second annular retainer has a plurality of protrusions that extend upward from the second annular retainer. Each of the protrusions has a slit for receiving a wedge, such that if the protrusions engage the wedge the second annular retainer is compressed against the capacitor.

DESCRIPTION OF THE PREFERRED EMBODIMENTS

In accordance with various embodiments, FIG. 1 through FIG. 13, inclusive, show a capacitor assembly that comprises a capacitor 29 with a generally cylindrical outer surface 22. The cylindrical outer surface 22 has a capacitor radius 30. A lower enclosure 64 has a first recess 62. The first recess 62 is generally cylindrical and has a first radius 60 greater than the capacitor radius 30. A first annular retainer (38 of FIG. 3, or 138 of FIG. 12) is adapted for engaging a lower portion 24 of the cylindrical outer surface 22 of the capacitor 29 and the first recess 62. The first annular retainer (38 of FIG. 4, or 138 of FIG. 13) has a plurality of tabs 44 that extend radially outward from an outer diameter surface 42 of the first annular retainer (38, 138). Each of the tabs 44 has a sloped surface 46 or a peaked surface, such that if the tabs 44 engage the first recess 62, the first annular retainer (38, 138) is compressed against the outer cylindrical surface 22 to retain the capacitor 29. An upper enclosure 95 has a plurality of second recesses 90. Each of the second recesses 90 is generally cylindrical and has a second radius less than the capacitor radius 30. A second annular retainer (52, 152) is adapted for engaging an upper portion 20 of the cylindrical outer surface 22 of the capacitor 29 and the second recesses 90, the second annular retainer (52, 152) has a plurality of protrusions 48 that extend upward from an upper ring portion 50 (or upper surface) of the second annular retainer (52, 152) in alignment with the second recesses 90. Each of the protrusions 48 has a slit 54 or other receptacle opening for receiving a wedge 70 or a tapered portion 71, such that if the protrusions 48 engage the wedge 70. The second annular retainer (52, 142) is compressed against the outer cylindrical surface 22 of the capacitor 29 to retain the capacitor 29.

Figures 3, 4:
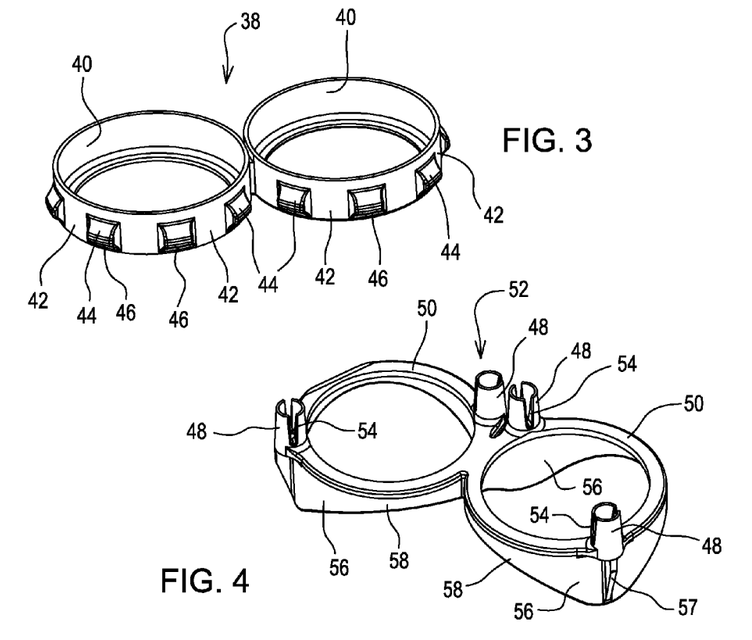
FIG. 3 is a perspective view a first dual annular retainer in accordance with one embodiment.
FIG. 4 is a perspective view of a second dual annular retainer in accordance with one embodiment.

In one embodiment, each first recess 62 has a generally annular trench 66 and wherein the first annular retainer (38, 138) is seated within the annular trench 66. In one configuration, each second annular retainer (52, 152) has an upper ring portion 50 and a lower portion 58 extending axially or downward from the upper ring portion 50. For example, the lower portion 58 comprises a curved clamping portion 56 associated with each respective protrusion 48, such that the curved clamping portion 56 is compressible against the outer cylindrical surface for retention of the capacitor 29. A rib 57 or structural ridge may extend from the outer surface of curved clamping portion 56. As illustrated in FIG. 4, the rib 57 extends downward from the protrusion 48 and may comprise an integral extension of the protrusion 48.

In an alternate embodiment, the lower portion 58 may comprise a cylindrical portion.

In one embodiment, the first annular retainer (38, 138), the second annular retainer (52, 152) or both may composed of a plastic, a polymer, a fiber filled plastic, a fiber filled polymer, an elastomer, or a resilient material. The first annular retainer (38, 138) and the second annular retainer (38, 138) are composed of a material that is flexibly resilient or capable of elastic deformation. The resilience of the material may provide additional shock dampening for the capacitors 129, for example.

In one configuration, lower enclosure 64 comprises fins 94 on an exterior surface of the lower enclosure 64. The exterior surface is opposite an interior surface associated with the first recess 62, or the interior surface in which the first recesses 62 reside. The lower enclosure 64 and the upper enclosure 95 collectively form a housing for the capacitor assembly. For example, the lower enclosure 64 may be coupled to, or secured to the upper enclosure 95 via an intermediate enclosure section 92.

In one configuration, the lower enclosure 64 portion and the upper enclosure 95 portion are urged toward each other by one or more fasteners that further exert a compressive retaining force against the upper portion 20 of the cylindrical outer surface 22 and the lower portion 24 of the cylindrical outer surface 22 via the first annular retainer (38, 138) and the second annular retainer (52, 152), respectively.

The capacitor assembly (e.g., 111 or 211) may be configured to retain a pair of capacitors 129, for instance. Accordingly, a secondary capacitor 29 may be spaced apart from the capacitor 29 in recesses within the lower enclosure 64. The secondary capacitor 29 has a generally cylindrical outer surface 22. The cylindrical outer surface 22 has a capacitor radius 30. The lower enclosure 64 has a secondary first recess 62 adjacent to the first recess 62. The secondary first recess 62 is generally cylindrical and has a first radius 60 greater than the capacitor radius 30.

In one embodiment, the first annular retainer (e.g., 38, 138) comprises a first dual annular retainer 38 with two annular segments. A first annular segment is arranged for engaging a lower portion 24 of the cylindrical outer surface 22 of the capacitor 29 and the first recess 62. A second annular segment is arranged for engaging a lower portion 24 of the cylindrical outer surface 22 of the secondary capacitor 29.

Figure 13:
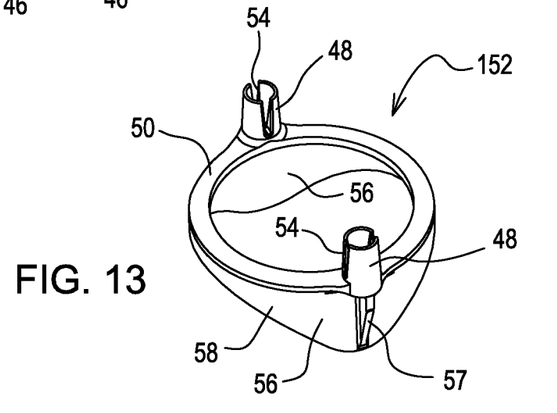
FIG. 13 is a perspective view of an alternate embodiment of a second annular retainer.

In one embodiment, the capacitor assembly may use dual annular retainers (38, 52), as opposed to single annular retainers (138, 152). In such an embodiment with a first dual annular retainer 38 and a second dual annular retainer 52, a capacitor assembly comprises a pair of capacitors 129. Each of the capacitors 129 has a generally cylindrical outer surface 22. The cylindrical outer surface 22 has a capacitor radius 30.

A lower enclosure 64 comprises a pair of first recesses 62. Each of the first recesses 62 is generally cylindrical and has a first radius 60 greater than the capacitor radius 30.

A first dual annular retainer 38 is adapted for engaging a lower portion 24 of the cylindrical outer surfaces 22 of the capacitors 129 and the first recesses 62. The first dual annular retainer 38 has a plurality of tabs 44 that extend radially outward from an outer peripheral surface 42 (or dual outer diameter surfaces) of the first dual annular retainer 38. Each of the tabs 44 has a sloped surface 46 or a peaked surface, such that if the tabs 44 engage the first recesses 62, the first dual annular retainer 38 is compressed against the outer cylindrical surfaces to retain the pair of the capacitors 129.

An upper enclosure 95 has a plurality of second recesses 90, each of the second recesses 90 is generally cylindrical and has a second radius less than the capacitor radius 30.

A second dual annular retainer 52 is arranged for engaging an upper portion 20 of the cylindrical outer surfaces 22 of the capacitors 129 and the second recesses 90. The second dual annular retainer 52 has a plurality of protrusions 48 that extend upward from an upper surface of the second dual annular retainer 52 in alignment with the second recesses 90. Each of the protrusions 48 has a slit 54 for receiving a wedge 70, such that if the protrusions 48 engage the wedge 70, the second dual annular retainer 52 is compressed against the outer cylindrical surfaces to retain the pair of the capacitors 129.

In one embodiment, each of the first recesses 62 has an annular trench 66 and wherein the first dual annular retainer 38 is seated within the annular trench 66es of the first recesses 62. Each second dual annular retainer 52 has a dual upper ring portion 50 and a dual lower portion 58 extending downward from the dual upper ring portion 50. For example, the lower portion 58 comprises a curved clamping portion 56 associated with each respective protrusion 48, such that the curved clamping portion 56 is compressible against the outer cylindrical surface 22 of the capacitor (e.g., and groove 26) for retention of the capacitor 29.

In an alternate embodiment, the lower portion 24 comprises a substantially cylindrical portion.

In one embodiment, the lower enclosure 64 comprises fins 94 on an exterior surface of the lower enclosure 64. The exterior surface is opposite an inner surface 40 with the first recess 62. The lower enclosure 64 and the upper enclosure 95 collectively form a housing for the capacitor assembly. The lower enclosure 64 is coupled to the upper enclosure 95 via an intermediate enclosure section.

In one configuration, the lower enclosure 64 portion and the upper enclosure 95 portion are urged toward each other by one or more fasteners that further exert a compressive retaining force against the upper portion 20 of the cylindrical outer surface 22s of the pair of capacitors 129 and the lower portion 24 of the cylindrical outer surface 22 of the pair of capacitors 129 via the first dual annular retainer 38 and the second dual annular retainer 52, respectively.

Figure 1:
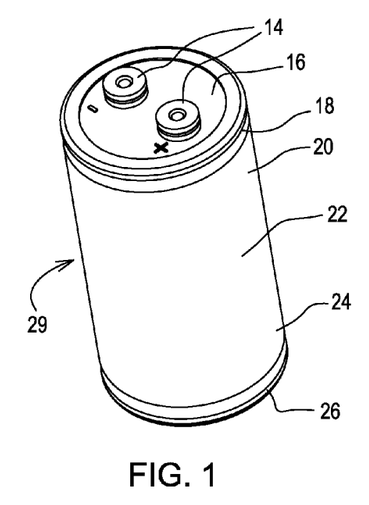
FIG. 1 and FIG. 2 are perspective views of a capacitor in accordance with one embodiment the invention.
Figure 2:
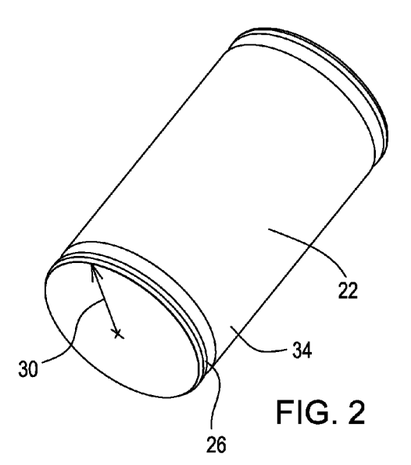

FIG. 1 and FIG. 2 show perspective views of an illustrative capacitor 29 in a generally cylindrical housing. The capacitor 29 comprises positive and negative terminals 14 on top 16 of the capacitor 29. A top 16 of the capacitor 29 may comprise a generally planer surface, for example. Near or within an upper portion 20 of the capacitor 29, in one embodiment there is a groove 18 in the capacitor 29 that can be used for mounting the capacitor 29 in or to a module with additional hardware (not shown). Similarly, near or within an lower portion 24 of the capacitor 29, in one embodiment there is a groove 26 in the capacitor 29 that can be used for mounting the capacitor 29 in or to a module with additional hardware (not shown). The capacitor 29 has a generally cylindrical outer surface 22. In one configuration, side wall or generally cylindrical outer surface 22 of the capacitor 29 is protected by a protective dielectric sheathing (e.g., polyvinylchloride (PVC) shrink wrap material) to provide some electrical insulation or isolation for the capacitor 29.

FIG. 2 shows an alternate view of the capacitor 29 that shows the bottom 28 and the capacitor radius 30. The capacitor radius 30 extends from a central axis or midpoint of the generally circular or elliptical bottom 28 to a cylindrical outer surface 22.

In one embodiment, the capacitors 129 are sometimes supplied with an electrical insulator pad (typically a rubber material) to provide electrical isolation to the capacitor 29, since the bottom 28 of the capacitor 29 is not covered by the outer sheathing of the capacitor 29 that covers the sidewall or cylindrical outer surface 22 of the capacitor 29.

In normal temperature ranges, the bottom 28 is electrically isolated by the combination of insulator pad. However, under heat extremes, the outer sheathing can potentially crack and leave gaps where the metallic casing of the capacitor 29 is exposed and can make contact with other metallic components, such as the metal cooling plate to which the capacitor 29 may be attached. Advantageously, the first dual annular retainer 38 shown in FIG. 3 is composed of a dielectric material that forms a dielectric barrier or redundant dielectric barrier between the bottom 28 of the capacitor 29 and a lower enclosure 64 or heat sink member. Further, the first dual annular retainer 38 provides spatial separation between the bottom 28 of the capacitor 29 and a corresponding first recess 62 within the lower enclosure 64.

The capacitor assembly securely holds or captively secures the capacitor 29 between the lower enclosure 64 and an upper enclosure 95 as will be described in greater detail below. By adding compressible first dual annular retainer 38 and second dual annular retainer 52 to the top 16 and bottom 28 of one or more capacitors 29, the one or more capacitors 29 can be securely mounted, eliminating the need for additional fasteners (such as screws) that will leave holes in the enclosure through which they pass, and sufficiently electrically isolated from the enclosure and cooling plate.

FIG. 3 discloses a perspective view of the first dual annular retainer 38. The first dual annular retainer 38 comprises a double mounting ring, where the first mounting ring is joined to a second mounting ring at their outer diameter. The first dual annular retainer 38 may be integrally formed by injection molding, or another manufacturing process. The first dual annular ring has an outer peripheral surface 42 with tabs 44 extending outward from the outer peripheral surface 42. The tabs 44 may be formed with a sloped or peaked surface for engagement with a rim (or peripheral step) of a corresponding first recess 62 in a lower enclosure 64.

FIG. 3 shows a first dual annular retainer 38 that can be pressed into place over the bottom 28 of the capacitor 29 or a pair of capacitors 129. The first dual annular retainer 38 may be composed of a compressible or resilient silicone rubber with an appropriately selected durometer (hardness) to allow the tabs 44 to be compressed while still being hard enough to hold the capacitor 29 in place when the capacitor 29 and bottom 28 first dual annular retainer 38 are pressed down into a first recess 62 (or recessed feature) in lower enclosure 64. As shown in FIG. 3, the first dual annular retainer 38 formed facilitates the concentrating of a maximum aggregate value of capacitance in a fixed spatial volume within an enclosure (by allowing the capacitors 129 to sit closer to each other than otherwise possible with separate annular retainers).

In an alternate embodiment, the first dual annular retainer 38 may be separated into two discrete annular retainers.

FIG. 4 shows a second dual annular retainer 52 that comprises a double mounting ring, where the first mounting ring is joined to a second mounting ring at their outer diameter. The second dual annular retainer 52 may be integrally formed by injection molding, or another manufacturing process. The second dual annular retainer 52 has an upper ring portion with protrusions 48 extending upward from the upper ring portion. The protrusions 48 are arranged for engagement with a second recesses 90 in an upper enclosure 95. The lower portion 58 of the second dual annular retainer 52 has one or more curved clamping portions 56. In one embodiment, each curved clamping portion 56 is associated with or located in the proximity of a corresponding protrusion 48. The curved clamping portion 56 may be described as a flap extension that is connected to at least an outer side of the protrusion 48 via rib 57 or structural ridge. If a wedge 70 or plug is placed into the slit 54 (e.g., mortise or other receptacle opening), the ridge forms a lever that transfers the outward force at its top 16 inward toward the capacitor 29 at the curved clamping portion 56, for example.

FIG. 4 shows a second dual annular retainer 52 that can be pressed into place over the top 16 of the capacitor 29 or a pair of capacitors 129. The second dual annular retainer 52 may be composed of a compressible or resilient silicone rubber with an appropriately selected durometer (hardness) to allow the tabs 44 to be compressed while still being hard enough to hold the capacitor 29 in place when the capacitor 29 and bottom 28 first dual annular retainer 38 are pressed down into a first recess 62 (or recessed feature) in lower enclosure 64. As shown in FIG. 4, the second dual annular retainer 52 formed facilitates the concentrating of a maximum aggregate value of capacitance in a fixed spatial volume within an enclosure (by allowing the capacitors 129 to sit closer to each other than otherwise possible with separate annular retainers).

In an alternate embodiment, the second dual annular retainer 52 may be separated into two discrete annular retainers (e.g., two annular retainers 52, as shown in FIG. 13).

Figure 7:
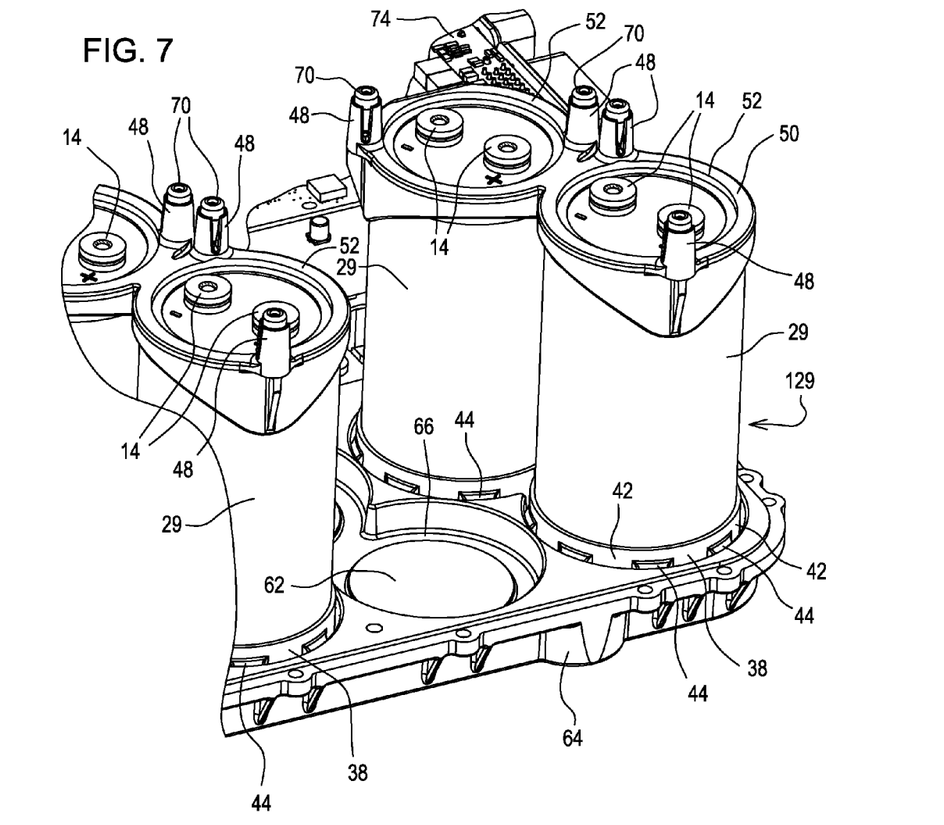
FIG. 7 is a perspective view of capacitors mounted in the lower enclosure with their respective first annular dual retainers and respective second annular dual retainers.
Figure 10:
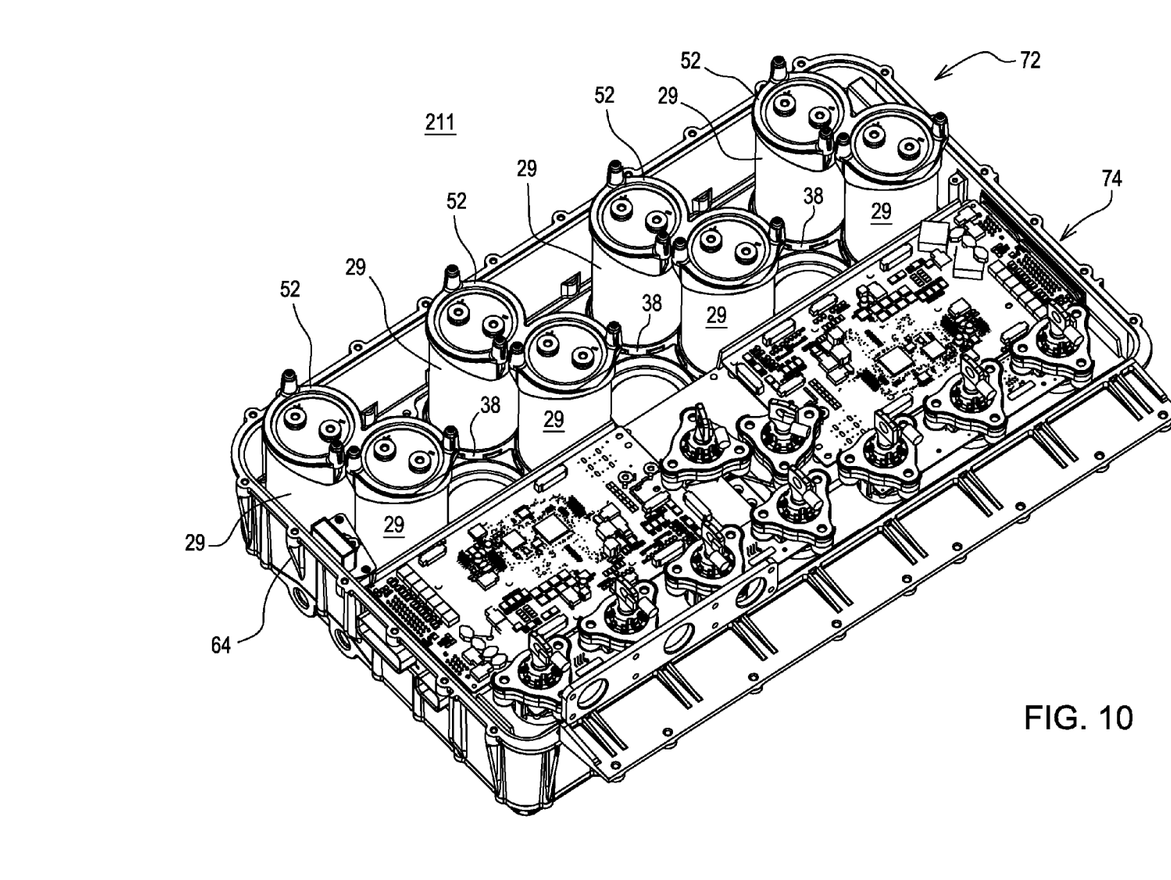
FIG. 10 is a perspective view of one embodiment of the assembled capacitor assembly with the upper enclosure removed for a better view of the capacitors and second annular dual retainers.

Consistent with FIG. 7 and FIG. 10, after placing the first dual annular retainer 38 on the bottom 28 of a pair of capacitors 129, the capacitors 129, with the attached first dual annular retainer 38, are placed in first recesses 62 within a lower enclosure 64. The second dual annular retainer 52 may be placed on the top 16 of the pair of capacitors 129. One or more wedges 70 are placed into the slits 54 or openings in the protrusions 48 of the second dual annular retainer 52.

Figure 8:
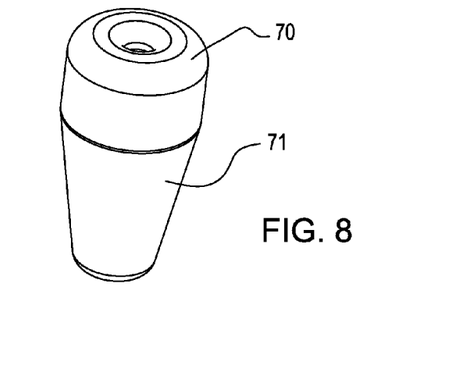
FIG. 8 is a perspective view a wedge for insertion into the second annular dual retainer in accordance with one embodiment.

In one embodiment, the wedge 70s may comprise small tapered plugs, consistent with the wedge 70 illustrated in FIG. 8. The wedge 70s may comprise rubber plugs.

Figure 9:
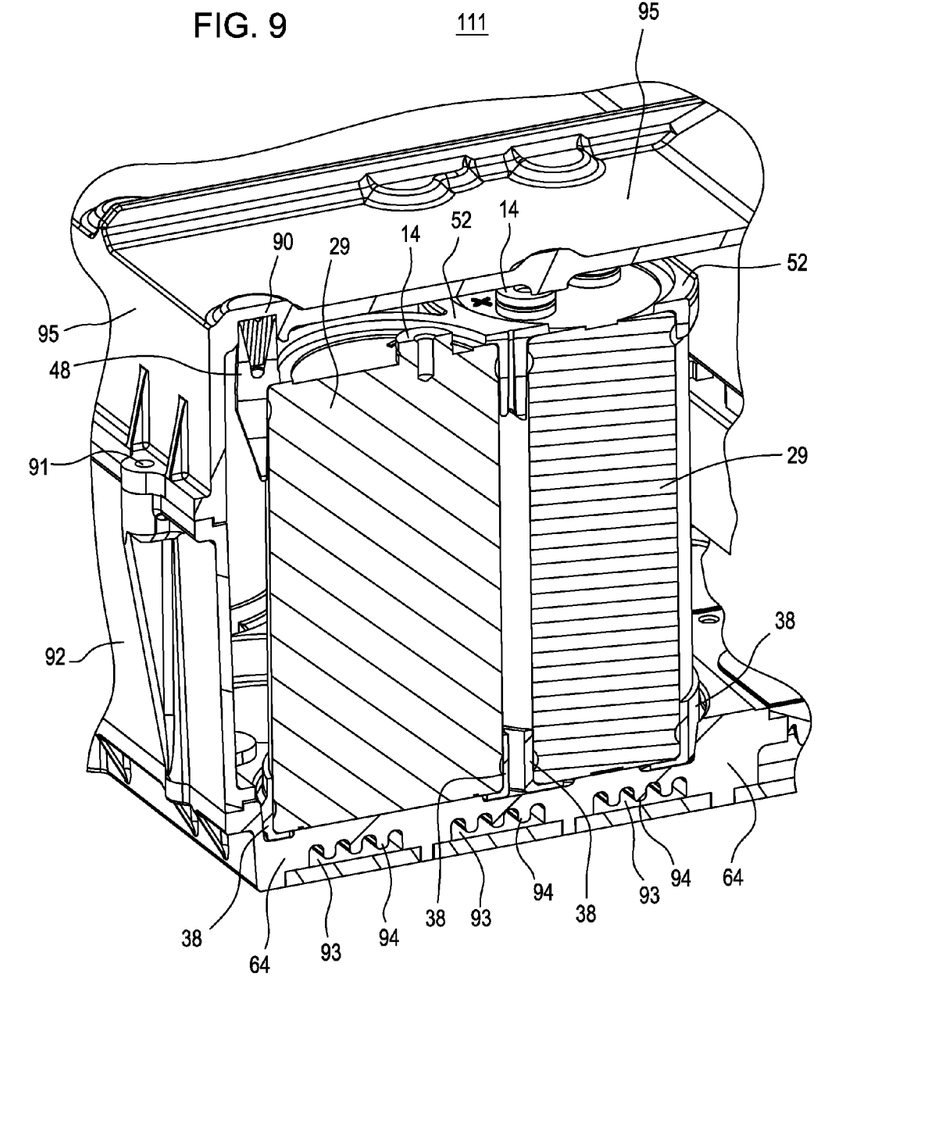
FIG. 9 is a cross-section of one embodiment of a capacitor assembly.
Figure 11:
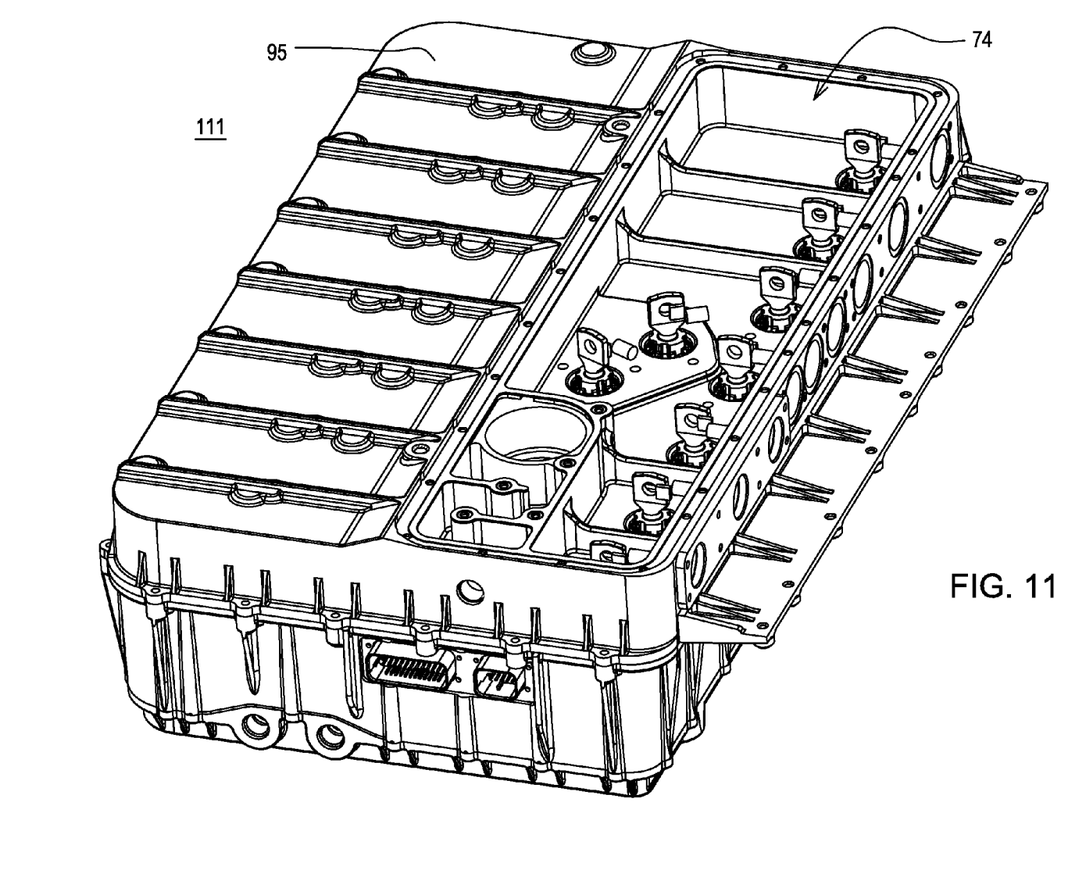
FIG. 11 is a perspective view of the capacitor assembly of FIG. 10 with the upper enclosure installed or secured to the lower enclosure.
Figure 12:
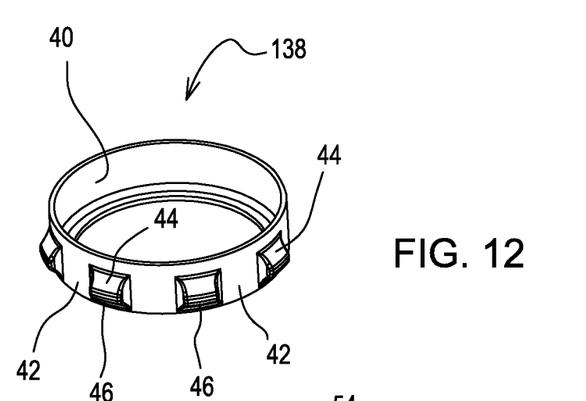
FIG. 12 is a perspective view of an alternate embodiment of a first annular retainer.

As shown in FIG. 9 and FIG. 11, an upper enclosure 95 is placed as a cover over the mounted capacitors 129. The upper enclosure 95 may be secured to a lower enclosure 64 directly, or via an intermediate section 92. One or more fasteners may be inserted into bores 91 to connect the lower enclosure 64 and the upper enclosure 95, or to urge the upper enclosure 95 and the lower enclosure 64 toward each other until they reach a seated position or resting position.

As shown in FIG. 9, upon installation, the upper enclosure 95 presses against the wedges 70, forcing the two halves of the protrusion 48 apart, holding them in place in a second recess in the upper enclosure 95.

In the one embodiment, the first dual annular retainer 38 is composed of a plastic such as polycarbonate with around ten percent glass fill, nylon, or any other appropriate dielectric material. The dielectric material should be relatively stiff, but allow the flaps to be flexed inward when the top 16 is compressed.

Figure 5:
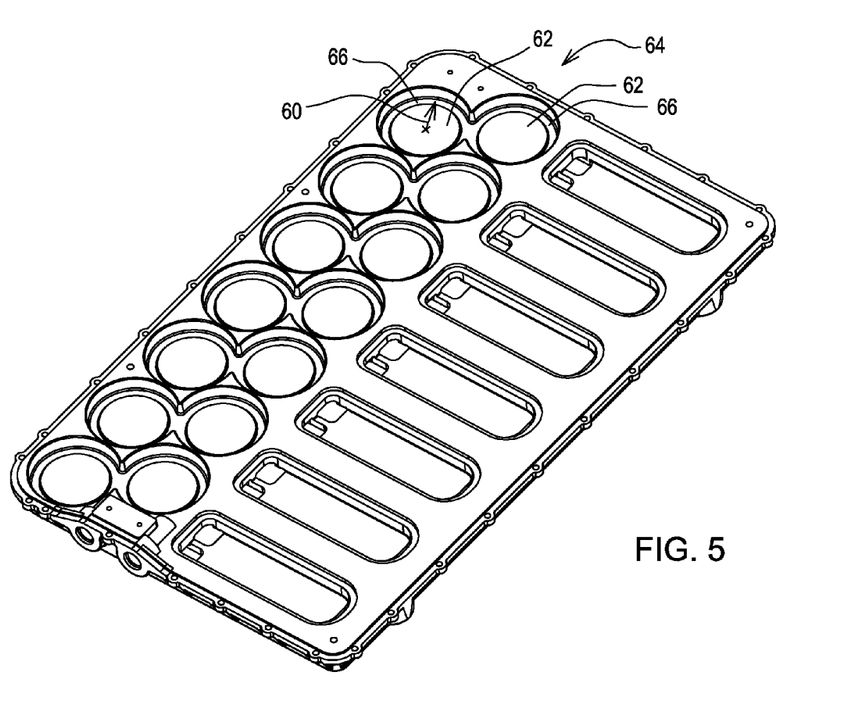
FIG. 5 is a perspective view of a lower enclosure in accordance with one embodiment.
Figure 6:
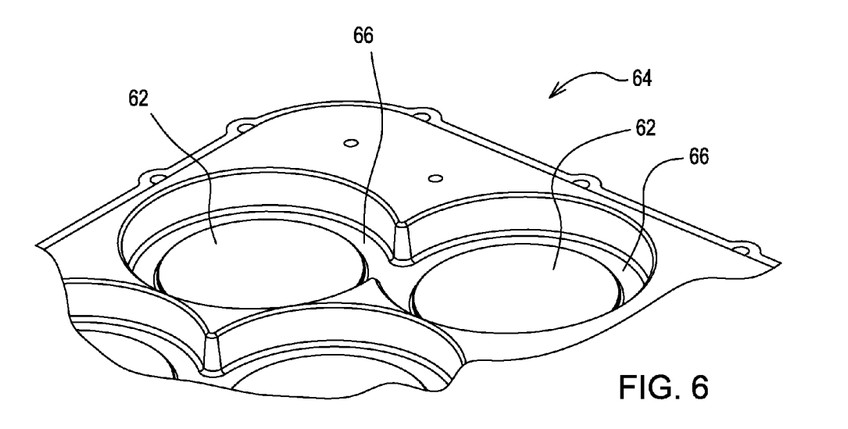
FIG. 6 is an enlarged view of a portion of FIG. 5.

FIG. 5 and FIG. 6 show a lower enclosure 64. In one embodiment, the lower enclosure 64 comprises a metallic cooling plate to which the capacitors 129 (and other electronic components) will be mounted. The cooling plate has a series of first recesses 62 specifically designed to hold one or more first dual annular retainers 38 and corresponding capacitors 129. The exterior surface or bottom 28 of the cooling plate (not shown here) will typically comprise fins 94 for heat dissipation. Further, the exterior surface may feature fins 94 and one or more coolant channels or passages 93 through with liquid coolant flows facilitate enhanced cooling of the capacitors 129. In one configuration, a majority of the heat coming from the bottom 28 of the capacitor 29 escapes from the middle of the bottom 28 or end of the capacitor 29.

In one embodiment, the first recesses 62 in the lower enclosure 64 have a center, raised platform or island surrounding by the annular trenches 66. The center raised platform may make contact with the bottom 28 of the capacitor 29 (through the insulator pad). In other embodiments, the first recesses 62 do not have a center raised platform to improve electrical isolation between the bottom 28 of the capacitor 29 and the lower enclosure 64. The tabs 44 on the first dual annular retainer 38 are compressed between the capacitor 29 and the walls or rim of the first recesses 62, for example.

FIG. 9 illustrates a cross section of a capacitor assembly. FIG. 9 illustrates how the capacitors 129, the first dual annular retainer 38, the second dual retainer, and plugs are assembled to create a stable mounting system for the capacitors 129 that is resistant to vibration, shock, mechanical stress and thermal stress, for instance. The first dual annular retainers 38 is snapped onto or placed onto of a pair of the capacitors 129. The inner surface 40 of the first dual annular retainer 38 may be coated with a silicone or another lubricant to allow the capacitor 29 to be driven all the way down to the installed position, such that the bottom 28 of the capacitor 29 (the insulator pad) is in contact with, or in close proximity to, the raised platform inside the recessed feature in the cooling plate. The tabs 44 are compressed as shown, creating a sufficient lock for the bottom 28 end of the capacitor 29. The tabs 44 are compressed between capacitor 29 and the walls or rim of first recesses 62 in lower enclosure 64. In one embodiment, the tabs 44 hold the capacitor 29 in place, and conform to the groove 18 feature in the bottom 28 of the capacitor 29, gripping it securely.

The second dual annular retainer 52 is placed on the top 16 end of the capacitors 129, such that the capacitor 29 terminals 14 extend out through the center opening of the second dual annular retainer 52. The wedge 70 is pushed into slits 54 of respective protrusions 48, pushing them radially outward. The clamping portion 56s of the second dual annular retainers 52 are pressed in by the radial outward force transmitted from the protrusion 48 via the rib 57 or structural ridge, causing the clamping portion 56 to clamp capacitor 29 bottom 28 rings against a lower portion 58 24 of the outer cylindrical surface of the capacitors 129.

The wedges 70 (e.g., rubber plugs) are illustrated in FIG. 8. When the tops 16 of the rubber plugs are compressed (pressed down toward the cooling plate), the outward portion of the slitted protrusion 48 are pressed outward, and the clamping portions 56 are forced inward to create a clamping force on the capacitor 29, locking it in place an preventing lateral movement in two dimensions.

FIG. 10 and FIG. 11 show alternate views of the capacitor assembly. In FIG. 10, the upper enclosure 95 is removed to better reveal the capacitor bank 72 in the capacitor assembly 211, which comprises multiple capacitors (29 or 129). FIG. 10 also illustrates electronic module 74. Although the electronic module 74 is illustrated as an inverter or other power electronics, an electronic module may fall within the scope of the claims appended to this document. In FIG. 11, the capacitor assembly 111 features the upper enclosure 95 installed.

In FIG. 11, the capacitors (29, 129) are held in place without the need for screws or other fastening means through the upper enclosure, which is a typical solution in the prior art. Placing fasteners through the outer enclosure creates multiple holes in the enclosure which require an environmental sealing solution, add additional failure points, and increase cost.

In accordance with one embodiment and in conjunction with FIG. 10, a capacitor assembly comprises a capacitor 29 with a generally cylindrical outer surface 22. A lower enclosure 64 has a first recess 62. A first annular retainer 138 (in FIG. 12) is adapted for engaging a lower portion 24 of the capacitor 29 and the first recess 62. The first annular retainer 138 has a plurality of tabs 44 that extend radially outward from an outer diameter surface 42 of the first annular retainer. Each of the tabs 44 has a sloped surface 46 or a peaked surface for compression of the first annular retainer against the capacitor 29. An upper enclosure 95 has a plurality of second recesses 90. A second annular retainer 152 (in FIG. 13) is adapted for engaging an upper portion 20 of the capacitor 29 and the second recesses 90. The second annular retainer 152 has a plurality of protrusions 48 that extend upward from the second annular retainer. Each of the protrusions 48 has a slit 54 for receiving a wedge 70, such that if the protrusions 48 engage the wedge 70 the second annular retainer is compressed against the capacitor 29.

In addition to firmly securing the capacitors without any kind of fasteners, capacitor assembly disclosed herein has also been designed to dampen low-frequency vibrations (e.g., 25 Hz to 5 KHz), which are especially problematic for mounted capacitors and other electronics in the harsh environments in which the vehicular electronics are expected to perform.

The capacitor assembly is well suited for securing large, cylindrical capacitors in an enclosure without using screws or other fasteners, and which provides a means for dampening low-frequency vibrations and electrically isolating the capacitors from the enclosure and other components.

Even if the protective dielectric sheathing of a capacitor is compromised (e.g., by cracking, splitting or rupturing) from thermal stress over time, the capacitor assembly disclosed in this document secures the capacitors in a fixed orientation that continues to provide electrical isolation between the capacitors and adjacent electrical components, electronic components, or electrical conductors at various voltage potentials with respect to ground.

Having described the preferred embodiment, it will become apparent that various modifications can be made without departing from the scope of the invention as defined in the accompanying claims.

The following is claimed:

1. A capacitor assembly comprises:
   a capacitor having a generally cylindrical surface;
   a lower enclosure having a first recess;
   a first annular retainer is adapted for engaging a lower portion of the capacitor and the first recess, the first annular retainer has a plurality of tabs that extend radially outward from an outer diameter surface of the first annular retainer, each of the tabs having a sloped surface or a peaked surface for compression of the first annular retainer against the lower portion of the capacitor;
   an upper enclosure having a plurality of second recesses; and
   a second annular retainer for engaging an upper portion of the capacitor and the second recesses; the second annular retainer having a plurality of protrusions that extend upward from the second annular retainer, each of the protrusions has a slit for receiving a wedge, such that if the protrusions engage the wedge the second annular retainer is compressed against the capacitor.

2. The capacitor assembly according to claim 1 wherein each first recess has a generally annular trench and wherein the first annular retainer is seated within the annular trench.

3. The capacitor assembly according to claim 1 wherein each second annular retainer has an upper ring portion and a lower portion extending axially or downward from the upper ring portion.

4. The capacitor assembly according to claim 3 wherein the lower portion comprises a curved clamping portion associated with each respective protrusion, such that the curved clamping portion is compressible against the outer cylindrical surface for retention of the capacitor.

5. A capacitor assembly comprising:
   a capacitor with a generally cylindrical outer surface, the cylindrical outer surface having a capacitor radius;
   a lower enclosure having a first recess, the first recess being generally cylindrical and having a first radius greater than the capacitor radius;
   a first annular retainer for engaging a lower portion of the cylindrical outer surface of the capacitor and the first recess, the first annular retainer having a plurality of tabs that extend radially outward from an outer diameter surface of the first annular retainer, each of the tabs having a sloped surface or a peaked surface, such that if the tabs engage the first recess, the first annular retainer is compressed against the outer cylindrical surface to retain the capacitor;
   an upper enclosure having a plurality of second recesses, each of the second recesses being generally cylindrical and having a second radius less than the capacitor radius; and
   a second annular retainer for engaging an upper portion of the cylindrical outer surface of the capacitor and the second recesses, the second annular retainer having a plurality of protrusions that extend upward from an upper surface of the second annular retainer in alignment with the second recesses, each of the protrusions having a slit for receiving a wedge, such that if the protrusions engage the wedge, the second annular retainer is compressed against the outer cylindrical surface to retain the capacitor.

6. The capacitor assembly according to claim 5 wherein each first recess has a generally annular trench and wherein the first annular retainer is seated within the annular trench.

7. The capacitor assembly according to claim 5 wherein each second annular retainer has an upper ring portion and a lower portion extending axially or downward from the upper ring portion.

8. The capacitor assembly according to claim 7 wherein the lower portion comprises a curved clamping portion associated with each respective protrusion, such that the curved clamping portion is compressible against the outer cylindrical surface for retention of the capacitor.

9. The capacitor assembly according to claim 7 wherein the lower portion comprises a cylindrical portion.

10. The capacitor assembly according to claim 5 wherein the lower enclosure comprises fins on an exterior surface of the lower enclosure, the exterior surface opposite an interior surface with the first recess.

11. The capacitor assembly according to claim 5 wherein the lower enclosure and the upper enclosure collectively form a housing for the capacitor assembly, the lower enclosure coupled to the upper enclosure via an intermediate enclosure section.

12. The capacitor assembly according to claim 5 wherein the lower enclosure portion and the upper enclosure portion are urged toward each other by one or more fasteners that further exert a compressive retaining force against the upper portion of the cylindrical outer surface and the lower portion of the cylindrical outer surface via the first annular retainer and the second annular retainer, respectively.

13. The capacitor assembly according to claim 5 further comprising:
   a secondary capacitor with a generally cylindrical outer surface, the cylindrical outer surface having a capacitor radius;
   the lower enclosure having a secondary first recess adjacent to the first recess, the secondary first recess being generally cylindrical and having a first radius greater than the capacitor radius; and
   the first annular retainer comprising two annular segments, a first annular segment arranged for engaging a lower portion of the cylindrical outer surface of the capacitor and the first recess, a second annular segment arranged for engaging a lower portion of the cylindrical outer surface of the secondary capacitor.

14. A capacitor assembly comprising:
   a pair of capacitors, each of the capacitors having a generally cylindrical outer surface, the cylindrical outer surface having a capacitor radius;
   a lower enclosure comprising a pair of first recesses, each of the first recesses being generally cylindrical and having a first radius greater than the capacitor radius;
   a first dual annular retainer for engaging a lower portion of the cylindrical outer surfaces of the capacitors and the first recesses, the first dual annular retainer having a plurality of tabs that extend radially outward from an outer peripheral surface of the first dual annular retainer, each of the tabs having a sloped surface or a peaked surface, such that if the tabs engage the first recesses, the first dual annular retainer is compressed against the outer cylindrical surfaces to retain the pair of the capacitors;
   an upper enclosure having a plurality of second recesses, each of the second recesses being generally cylindrical and having a second radius less than the capacitor radius; and
   a second dual annular retainer for engaging an upper portion of the cylindrical outer surfaces of the capacitors and the second recesses, the second dual annular retainer having a plurality of protrusions that extend upward from an upper surface of the second dual annular retainer in alignment with the second recesses, each of the protrusions having a slit for receiving a wedge, such that if the protrusions engage the wedge, the second dual annular retainer is compressed against the outer cylindrical surfaces to retain the pair of the capacitors.

15. The capacitor assembly according to claim 14 wherein each of the first recesses has an annular trench and wherein the first dual annular retainer is seated within the annular trenches of the first recesses.

16. The capacitor assembly according to claim 14 wherein each second dual annular retainer has a dual upper ring portion and a dual lower portion extending downward from the dual upper ring portion.

17. The capacitor assembly according to claim 16 wherein the lower portion comprises a curved clamping portion associated with each respective protrusion, such that the curved clamping portion is compressible against the outer cylindrical surface for retention of the capacitor.

18. The capacitor assembly according to claim 16 wherein the lower portion comprises a substantially cylindrical portion.

19. The capacitor assembly according to claim 14 wherein the lower enclosure comprises fins on an exterior surface of the lower enclosure, the exterior surface opposite an interior surface with the first recess.

20. The capacitor assembly according to claim 14 wherein the lower enclosure and the upper enclosure collectively form a housing for the capacitor assembly, the lower enclosure coupled to the upper enclosure via an intermediate enclosure section.

21. The capacitor assembly according to claim 14 wherein the lower enclosure portion and the upper enclosure portion are urged toward each other by one or more fasteners that further exert a compressive retaining force against the upper portion of the cylindrical outer surfaces of the pair of capacitors and the lower portion of the cylindrical outer surface of the pair of capacitors via the first dual annular retainer and the second dual annular retainer, respectively.

* * * * *